United States Patent Office 3,463,740
Patented Aug. 26, 1969

3,463,740
FORMALDEHYDE IN THE REMOVAL OF NITRATE IONS FROM REGENERATED ALKYLATION CATALYSTS
Arthur D. Ketley, Bethesda, and Thomas R. Steadman, Kensington, Md., assignors to W. R. Grace & Co., New York, N.Y., a corporation of Connecticut
No Drawing. Filed Mar. 24, 1967, Ser. No. 625,634
Int. Cl. B01s 11/04; C07c 67/04
U.S. Cl. 252—416                                   4 Claims

ABSTRACT OF THE DISCLOSURE

Catalyst systems containing Group VIII noble metals used in the production of vinyl acetate by the reaction of ethylene, acetic acid and oxygen are regenerated by oxidation with nitric acid and molecular oxygen or air, and subsequently reacted with hydrochloric acid and then formaldehyde to remove substantially all nitrate ion remaining in the catalyst mixture.

---

The present invention relates to a method for regenerating catalysts used in the production of vinyl acetate, and more specifically to a method by which spent Group VIII noble metal containing catalysts used in production of vinyl acetate by the reaction of ethylene, acetic acid and oxygen may be quickly and economically regenerated.

It is well known that Group VIII noble metal salts in combination with a redox metal salt such as copper chloride, and an alkali metal acetate ingredient will efficiently catalyze the reaction of ethylene, acetic acid and oxygen to form vinyl acetate according to the following overall equation:

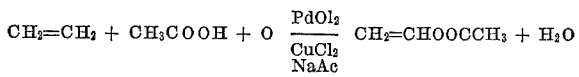

As the above reaction proceeds, the active

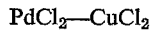

catalyst is converted to inactive oxalate, free metals and other non-catalytic products. Furthermore, other undesirable side products including polymeric materials are formed. It is found that the spent catalytic ingredients are removed from a reaction zone in the form of a largely insoluble sludge.

To redissolve the sludge material and regenerate the spent catalyst to active material, prior workers have suggested oxidizing the sludge components with nitric acid and molecular oxygen. The resultant metal nitrates are then converted to the chloride form by reaction with excess hydrochloric acid subsequent to removing most of the nitric acid by scrubbing with air.

It is found that the catalytic efficiency regained by a vinyl acetate catalyst system which has been treated with nitric acid depends to a large extent upon the thoroughness with which the nitrate ion is removed. As a practical matter, the economical removal of the last traces of nitrate ion by way of scrubbing with air or oxygen is exceptionally difficult.

It is therefore an object of the present invention to provide an improved method for regenerating Group VIII noble metal containing catalyst used in the production of vinyl acetate by reaction of ethylene, acetic acid and oxygen.

It is another object to provide a simple and inexpensive method by which substantially the last traces of nitrate ion may be removed from a Group VIII noble metal catalyst system which has been previously oxidized by treatment with nitric acid and molecular oxygen.

These and still further objects of the present invention will become readily apparent to one skilled in the art from the following detailed description and specific examples.

Broadly, we have found that the efficiency of a spent vinyl acetate producing Group VIII noble metal catalyst system, which has been regenerated by oxidation with nitric acid and molecular oxygen, may be substantially improved if the oxidized catalyst subsequent to removal of most nitrate by scrubbing with air or oxygen, is reacted with formaldehyde to remove substantially the last traces of nitrate ion.

More specifically, the present invention is concerned with a catalyst regeneration procedure wherein a spent vinyl acetate Group VIII noble metal containing catalyst system is firstly extracted with water to remove soluble species; secondly, the residue is treated with nitric acid and molecular oxygen to fully oxidize the compounds contained therein; thirdly, scrubbing the oxidized mixture with air or oxygen to remove most of the nitrate ion; fourthly, reacting the oxidized mixture with a stoichiometric excess of hydrochloric acid to convert metal components to chlorides; and fifthly, reacting the catalytic chloride mixture with formaldehyde to remove substantially all residual nitrate therefrom.

The catalyst systems treated in accordance with the practice of the present invention generally contain three major ingredients: First, a noble metal salt such as set forth in Group VIII of the periodic table and including salts of palladium, ruthenium, rhodium and platinum. These metals are combined with anions such as chloride and acetate. The second ingredient is a redox metal especially salts of metals such as copper and iron. Particularly chlorides of copper and iron as well as manganese, chromium, titanium tin, cobalt, nickel, uranium, mercury, vanadium, and osmium may be used. These metals may be combined with anions such as sulfate and arsenate as well as chloride. The third component comprises an alkali metal salt of acetic acid. Preferably such salt will be sodium acetate or potassium acetate. However, salts such as lithium acetate may be used.

As well known and disclosed in the prior art the above catalysts are generally used to promote the liquid phase reaction of ethylene, acetic acid and oxygen to produce vinyl acetate. This reaction is generally conducted at a temperature of from about 25° to about 125° C. using conventional reaction equipment.

During the course of a typical vinyl acetate production run the active catalytic composition is deposited in form of insoluble sludge which contains in addition to reduced metal and inactive oxalate compounds thereof various organic polymer materials which must be periodically removed. Obviously, since the catalyst mixture represents a large expense in a vinyl acetate process, substantially all of the metals must be regenerated if the procedure is to operate economically.

The sludge material as recovered from the vinyl acetate process is first reacted with water to remove soluble species and then with nitric acid and molecular oxygen which may be provided in the form of air at a temperature of from about 25 to about 110° C. for a period of from 10 to about 180 min. The nitric acid used during this procedure contains from about 10 to about 70 percent nitric acid and generally from about 0.1 to about 1.0 parts by weight nitric acid per part by weight catalytic sludge is reacted.

During the oxidation with nitric acid and oxygen most of the sludge becomes solubilized whereat the mixture is preferably scrubbed with oxygen to remove most of the nitrate present in the reaction mixture. The nitric acid removed by the air scrubbing may be subsequently recovered for use in subsequent operations.

Preferably after removing most of the excess nitric acid by air scrubbing, the catalyst composition is combined with a stoichiometric excess of hydrochloric acid to convert the catalytic materials to the chloride form preferably used in a vinyl acetate synthesis procedure and scrubbed again with air to remove more nitrate.

Subsequent to conversion to chloride the reaction mixture is combined with sufficient formaldehyde to remove substantially the last traces of nitrate present in the reaction mixture. It is found that this nitrate removal is necessary to produce a vinyl acetate producing catalyst which possesses maximum efficiency. In general it is found that from about 0.005 to about 0.05 part by weight formaldehyde are sufficient to remove the last traces of nitrate ion present after a reasonably efficient scrubbing operation conducted in the manner described above.

Having described the broad aspects of the present invention the following examples are given to illustrate specific embodiments thereof.

Example I 39.8 g. of spent vinyl acetate catalyst (containing 60% solids) was treated with 350 ml. of water and heated to reflux. The resultant slurry was filtered.

The solid residue (~6 g.) was then heated to reflux for 0.5 hr. with 6 ml. of 16 N $HNO_3$ while passing 1 liter/min. of oxygen through the slurry.

5.3 of glacial acetic acid was added to the slurry followed by 24 ml. of 12 N HCl over a 20 min. period. The resultant solution was heated to reflux and 1 liter/min. of air was passed through it for 2 hr. At this point the solution contained .0028 mole (0.17 g.) of nitrate ion.

A slight excess (0.15 g.) of formaldehyde was bubbled into the solution at 100° C. Finally, another 10 ml. of 12 N HCl was added and this solution added to the initial water extract. This final mixture contains all the metal salts initially present in the form of chlorides and no measurable amount of nitrate ion. This mixture is suitable to be returned to the reactor for the manufacture of vinyl acetate.

We claim:

1. In a method for regenerating noble metal containing vinyl acetate producing catalyst compositions, said compositions being firstly oxidized with nitric acid and molecular oxygen, and secondly converted to an aqueous solution of said catalyst in a chloride form, the improvement which comprises reacting said aqueous solution with formaldehyde to substantially free said aqueous solution of nitrate ions.

2. The method of claim 1 wherein an excess of formaldehyde is used to substantially free said solution of nitrate ions.

3. The method of claim 1 wherein the reaction with formaldehyde is conducted at a temperature of from about 25° to about 110° C.

4. The method of claim 1 wherein said vinyl acetate catalyst comprises palladium chloride, copper chloride, and sodium acetate.

References Cited

UNITED STATES PATENTS

| | | | |
|---|---|---|---|
| 3,210,152 | 10/1965 | Van Helden et al. | 260—497 |
| 3,300,528 | 1/1967 | Wakasa et al. | 260—497 |

FOREIGN PATENTS

| | | |
|---|---|---|
| 1,016,626 | 1/1966 | Great Britain. |

DANIEL E. WYMAN, Primary Examiner

P. E. KONOPKA, Assistant Examiner

U.S. Cl. X.R.

252—411, 416; 260—497